US012613140B2

(12) United States Patent
Wey

(10) Patent No.: US 12,613,140 B2
(45) Date of Patent: Apr. 28, 2026

(54) METHODS AND SYSTEMS FOR MEASUREMENT OF NONTHERMAL FAR INFRARED RADIATION

(71) Applicant: Albert Chin-Tang Wey, Westmont, IL (US)

(72) Inventor: Albert Chin-Tang Wey, Westmont, IL (US)

( * ) Notice: Subject to any disclaimer, the term of this patent is extended or adjusted under 35 U.S.C. 154(b) by 416 days.

(21) Appl. No.: 18/370,289

(22) Filed: Sep. 19, 2023

(65) Prior Publication Data

US 2024/0003747 A1 Jan. 4, 2024

Related U.S. Application Data

(63) Continuation-in-part of application No. 17/473,799, filed on Sep. 13, 2021.

(51) Int. Cl.
| | |
|---|---|
| *G01J 5/53* | (2022.01) |
| *G01J 5/00* | (2022.01) |
| *G01J 5/02* | (2022.01) |
| *G01J 5/48* | (2022.01) |

(52) U.S. Cl.
CPC ................. *G01J 5/53* (2022.01); *G01J 5/026* (2013.01); *G01J 5/485* (2022.01); *G01J 2005/0077* (2013.01)

(58) Field of Classification Search
CPC .... G01J 5/53; G01J 5/026; G01J 5/485; G01J 2005/0077; G01J 5/0003; G01J 5/802; G01J 5/532; G01J 5/70; A61N 2005/0626; A61N 5/0625; A61N 2005/066; C04B 2235/3225; C04B 2235/3239; C04B 2235/3244; C04B 2235/3262; C04B 2235/3275; C04B 2235/3281; C04B 2235/3409; C04B 2235/401; C04B 35/01; C04B 2235/3217; C04B 2235/3232; C04B 2235/3241; C04B 2235/3251; C04B 2235/3272; C04B 2235/3279; C04B 2235/3284; C04B 2235/3418
See application file for complete search history.

(56) References Cited

U.S. PATENT DOCUMENTS

| | | | |
|---|---|---|---|
| 3,376,748 A * | 4/1968 | Glomb .................... | G01J 5/532 |
| | | | 374/129 |
| 6,200,537 B1 | 3/2001 | Watanabe et al. | |
| 6,402,991 B1 | 6/2002 | Itakura et al. | |
| 6,890,457 B2 | 5/2005 | Umehara et al. | |
| 7,395,554 B2 | 7/2008 | Kitayama | |
| 7,406,956 B1 | 8/2008 | Fujii | |
| 7,637,858 B2 | 12/2009 | Miyasaka | |

(Continued)

FOREIGN PATENT DOCUMENTS

| | | | | |
|---|---|---|---|---|
| CN | 86108495 A | * | 7/1987 | ............... G01J 5/28 |
| CN | 102879106 B | * | 8/2014 | |

(Continued)

*Primary Examiner* — Laura Martin
*Assistant Examiner* — Julia Fitzpatrick
(74) *Attorney, Agent, or Firm* — IpHorgan Ltd.

(57) ABSTRACT

The present invention generally relates to devices, systems, and methods for detecting and measuring the radiant power and emissivity of nonthermal far infrared radiation (FIR) in 3-16 μm wavelength spectrum from the surface of a FIR-photons emitting object and, more specifically, in 8-14 μm wavelength range.

16 Claims, 6 Drawing Sheets

(56)     References Cited

U.S. PATENT DOCUMENTS

| | | | |
|---|---|---|---|
| 7,795,583 | B1 | 9/2010 | Hubbard et al. |
| 7,976,934 | B2 | 7/2011 | Arai |
| 8,104,455 | B2 | 1/2012 | Kitajima et al. |
| 8,176,899 | B2 | 5/2012 | Lee |
| 8,285,391 | B2 | 10/2012 | Malak |
| 8,389,939 | B1 | 3/2013 | Stanley et al. |
| 9,308,388 | B2 | 4/2016 | Chau |
| 9,357,963 | B1 | 6/2016 | Spahn et al. |
| 9,388,735 | B2 | 7/2016 | Wey |
| 9,962,441 | B2 | 5/2018 | Vissman et al. |
| 10,272,920 | B2 | 4/2019 | Shikii et al. |
| 10,610,699 | B2 | 4/2020 | Wey |
| 11,604,098 | B2 | 3/2023 | Price et al. |
| 2010/0246631 | A1 * | 9/2010 | Barlett ...................... G01J 5/60<br>374/2 |
| 2012/0175526 | A1 | 7/2012 | Seo et al. |
| 2021/0123818 | A1 | 4/2021 | Wang |
| 2021/0228903 | A1 | 7/2021 | Wey |
| 2021/0341337 | A1 | 11/2021 | Chevalier |
| 2023/0080964 | A1 | 3/2023 | Wey |
| 2023/0204429 | A1 | 6/2023 | Wang et al. |
| 2023/0245541 | A1 | 8/2023 | Amir et al. |

FOREIGN PATENT DOCUMENTS

| | | | | | |
|---|---|---|---|---|---|
| CN | 107084791 | A | * | 8/2017 | ................ G01J 3/28 |
| DE | 10322147 | A1 | * | 12/2004 | ................ G01J 3/42 |
| GB | 2326231 | A | * | 12/1998 | ................ G01J 3/28 |

* cited by examiner

Wavelength (µm)

Temperature (°C)

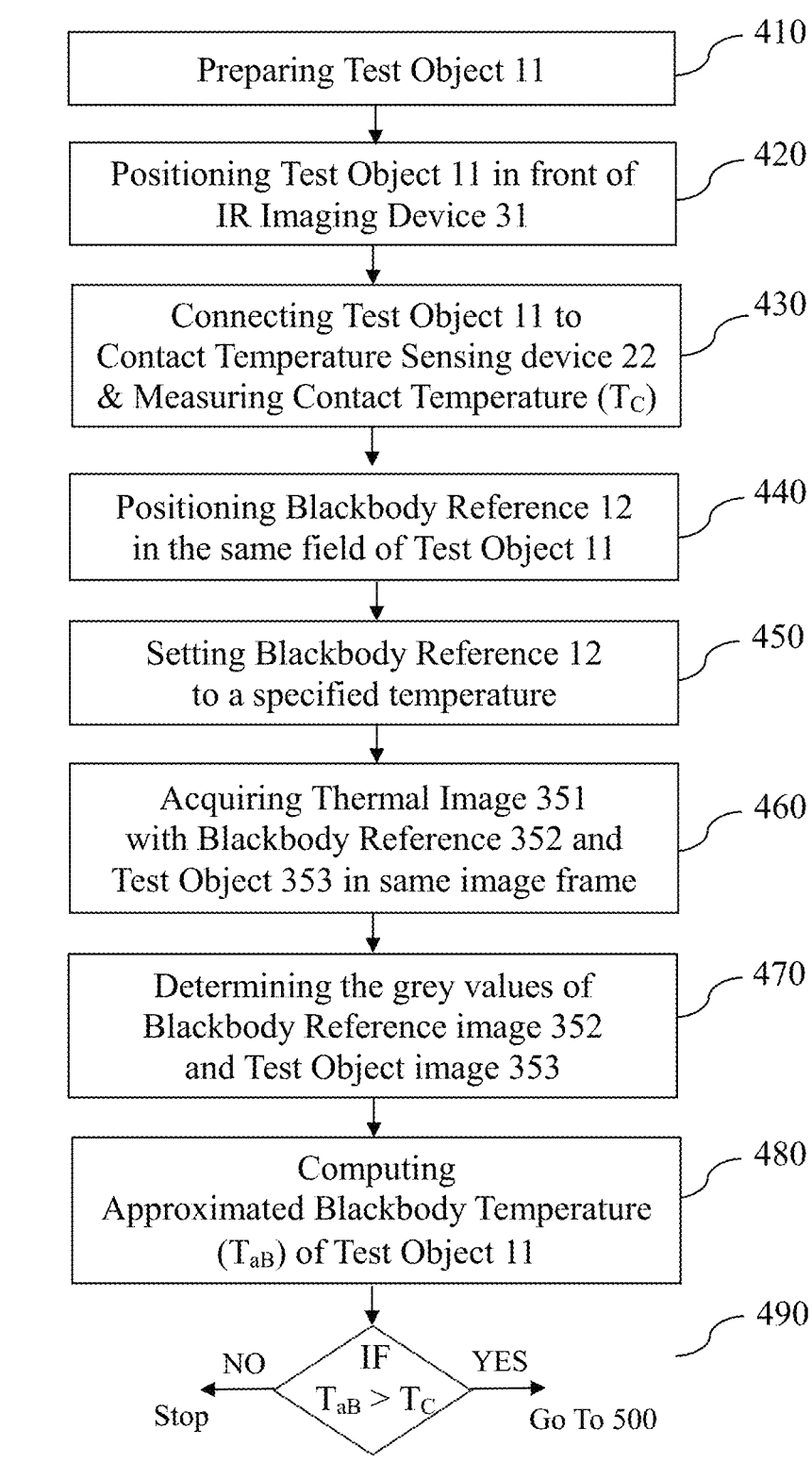

400

410 — Preparing Test Object 11

420 — Positioning Test Object 11 in front of IR Imaging Device 31

430 — Connecting Test Object 11 to Contact Temperature Sensing device 22 & Measuring Contact Temperature (T$_C$)

440 — Positioning Blackbody Reference 12 in the same field of Test Object 11

450 — Setting Blackbody Reference 12 to a specified temperature

460 — Acquiring Thermal Image 351 with Blackbody Reference 352 and Test Object 353 in same image frame 470 — Determining the grey values of Blackbody Reference image 352 and Test Object image 353

480 — Computing Approximated Blackbody Temperature (T$_{aB}$) of Test Object 11

490 — IF T$_{aB}$ > T$_C$    NO → Stop    YES → Go To 500

METHODS AND SYSTEMS FOR MEASUREMENT OF NONTHERMAL FAR INFRARED RADIATION

CROSS REFERENCE TO RELATED APPLICATIONS

This application is a continuation-in-part application claiming the benefit of application Ser. No. 5 17/473,799 filed Sep. 13, 2021. This application is incorporated by reference herein in its entirety.

BACKGROUND

Field of Invention

The present invention generally relates to devices, systems, and methods for detecting and measuring the radiant power and emissivity of nonthermal far infrared radiation (FIR) in 3-16 µm wavelength spectrum from the surface of a FIR-photons emitting object and, more specifically, in 8-14 µm wavelength range.

Description of Prior Art

Infrared (IR) light therapy (wavelength, $\lambda$=700-1070 nm) has been studied for years for its potential application in medicine. Hundreds of clinical trials and thousands of laboratory studies have been conducted, and some evidence suggests that IR-light therapy has certain therapeutic benefits, such as promoting wound healing, relieving pain and inflammation, boosting immune system responses, reducing side effects of cancer treatments, and so on. However, IR-light therapy founds on thermal radiation and thus has heat-related drawbacks and limitations in treatment.

By contrast, far infrared (FIR) therapy claims the use of nonthermal FIR-photons radiation for treatment and has become a hopeful alternative. The general belief is that absorption of FIR-photons at 3-16 µm wavelengths causes molecular vibrations to increase internal energy and thus increases the reaction rate by reducing reaction barrier.

All bioeffects in human or animal body are chemical reactions. The biochemical reaction rates may be increased respectively to a different degree by thermal radiation or by specific nonthermal FIR-photons radiation at 3-16 µm wavelengths. The chemical reaction rate is described by the Arrhenius equation:

$$k=A \exp(-E_A/RT) \qquad \text{(Equation 1)}$$

where k is the rate constant, A=pre-exponential factor,
$E_A$=activation energy required ("activation barrier" or "reaction barrier"),
R=gas constant, and T=temperature in ° K.

Absorption of blackbody thermal radiation (radiative heat) can increase the body's temperature. As temperature (T) increases, the rate of reaction (k) also increases.

At a rough approximation for many reactions happening at around room temperature, the rate of reaction doubles for every 10° C. (or 10° K) rise in temperature. For a typical IR-light therapy using thermal radiation, it may increase the skin temperature by about 3-5° C., resulting in about 10-40% increase in reaction rate.

On the other hand, FIR photons at 3-16 µm wavelengths can be absorbed by molecules in the body causing molecular vibrations. It has an effect on reducing activation barrier ($E_\lambda$) by about 8-40 KJ, given by the formula: $E_\lambda$ (KJ)=120

KJ/$\lambda$(µm). Correspondingly, the reaction rate may be improved exponentially, $\exp(E_\lambda/RT)$, by as much as 5,000-10,000%.

It is indeed this phenomenal effect that motivates the development of FIR composites for therapeutic applications, to radiate not only the conventional blackbody thermal radiation but also the specific nonthermal FIR-photons radiation in 3-16 µm wavelength spectrum. Yet, numerous FIR therapeutic devices developed over the years had only shown limited effects.

The setback was apparently caused by the confusion between blackbody-FIR radiation (thermal radiation) and nonthermal FIR-photons radiation. The fact is that all previous inventions of FIR composites radiate nothing but blackbody-FIR. They hardly contain any nonthermal FIR-photons at 3-16 um wavelengths in the radiation at all.

Blackbody radiation is the thermal electromagnetic radiation emitted by a black body that is in thermodynamic equilibrium with its environment. It has a specific, continuous spectrum of wavelengths that depend only on the body's temperature. The emitted radiation is closely described by Planck's law and because of its dependence on temperature, Planck radiation is said to be thermal radiation.

All objects on earth emit thermal radiation, more or less. The thermal radiation emitted by ordinary objects can be approximated as blackbody radiation. A black body at room temperature (25° C., or 298° K) radiates mostly in the infrared spectrum, spanning across 4-1,000 µm spectrum, with a peak at 9.4 µm and 90% of total energy amassed in 4-25 µm range.

In therapeutic applications, the wavelengths of interest are 3-16 µm, which happen to largely overlap the blackbody (thermal) radiation spectrum in 4-25 µm range at room temperature. Unfortunately, it often creates a confusion between nonthermal FIR-photons emission and blackbody-FIR radiation, because both occupy the same segment of infrared spectrum.

There is an essential difference between blackbody thermal radiation and nonthermal FIR-photons radiation, with regard to interaction with matters. Blackbody radiation behaves as photons only when it encounters free molecules in gas state. When blackbody radiation encounters molecules in condensed matters (liquids or solids), it acts like nothing but thermal radiation for heat transfer.

That said, all past inventions of FIR therapeutic products had mistakenly used blackbody thermal radiation in 4-25 µm band and wished for an effect that only the specific nonthermal FIR-photons radiation in 3-16 µm range would offer.

This imperative mistake is reflected by the fact that all prior FIR inventions have been theoretically entrenched in the concept of "the equality of absorptivity and emissivity", described by the Planck's law and Kirchhoff's law. As such, the Fourier-transformed infrared (FTIR) Spectroscopy becomes the only tool used for determining the emissivity of FIR products.

The emissivity of the surface of a material is its effectiveness in emitting energy as thermal radiation. Quantitatively, emissivity, $\varepsilon$, is the ratio of the radiant energy emitted by a surface to that emitted by a black body at the same temperature, given by the Stefan-Boltzmann law. The ratio varies from 0 to 1 (i.e., $0<\varepsilon<1$). All real objects have emissivities less than 1.0, and emit radiation at correspondingly lower rates. For example, objects like fabric, glass, charcoal, concrete, porcelain, rubber, and sand, all have an emissivity between 0.80 and 0.98.

Conventionally, the emissivity of a material is measured by a FTIR Spectrometer, which provides polarized, angular diffuse reflectance measurements from 8° to 80° incident angles, for the entire spectral region covered by the FTIR. The spectral region is nominally 2.0-25.0 μm using the standard FTIR optics.

Accordingly, one key aspect in conventional FIR-emitting composite design is to have an emissivity as close to 1.0 as possible, using the emissivity results of FTIR as benchmarks. Although each inventor might have his own ideas for making FIR composites, most prior FIR inventions resulted in only an emissivity around 0.85-0.95 by treating all constituent oxides equally and indifferently. As a result, those FIR products could only radiate thermal radiation.

This misconception has unwittingly prevailed in FIR industry for decades, due to not knowing the genuine mechanism of FIR-photons emission as well as lack of effective tools for detecting nonthermal FIR-photons radiation.

In general, the nonthermal radiant energy of FIR-photons is so small, approximately in milliwatts (mW) at room temperature, that the thermal noise is prominent. The foremost problem is that the nonthermal FIR-photons radiation in 3-16 μm is always submerged in the massive background noise of thermal radiations in 4-25 μm from the ambience at room temperature. It makes the nonthermal FIR-photons radiation inseparable and thus undetectable.

During the development of FIR ceramic module for therapeutic applications, the present inventor felt an urgent need for a reliable apparatus to detect and measure the nonthermal FIR-photons radiation. The present inventor then discovered an approach to leverage on aforesaid overlap in wavelength spectrum to effectively detect the very low power, nonthermal FIR-photons radiation, which otherwise would be untraceable alone. Preliminary results were reported without detailed description about the procedure (US Pat. Appl. US 2023/0080964 A1).

After extensive research since, the present inventor has come to realize the measurement method of present invention. It involves measuring the total radiant power from the surface of a test object, including both nonthermal FIR-photons radiation and blackbody-FIR radiation over the anticipated 3-16 μm wavelength band. Essentially, the small radiant power of nonthermal FIR-photons radiation may be extrapolated from the total power measurement, if the radiant power of blackbody-FIR radiation is given.

As 50% of total energy of theoretical Planck distributions over the 8-14 μm wavelength band at different temperatures around room temperature are proportionate, the measurement method of present invention, called "Blackbody Temperature Approximation", would rather focus on this band for practical reasons, but not to compromise accuracy and consistency.

The method of present invention provides a simple but reliable way to detect and measure FIR-photons emission at mW level. More significantly, it presents the evidence of nonthermal FIR-photons emission that was otherwise invisible and imperceptible.

The conventional FTIR method can only measure emissivity up to 1.0 for thermal radiation from blackbody-like objects. However, the Blackbody Temperature Approximation method of present invention may measure any effective emissivity greater than 1.0 for those FIR-composites emitting nonthermal FIR-photons in addition to normal blackbody-FIR thermal radiation. In other words, a greater-than-1.0 emissivity would be an indicative that the test object does indeed have a persistent FIR-luminescence mechanism and emit nonthermal FIR-photons.

The measurement method of present invention employs thermal imaging technology. Thermal Imaging (or Infrared Thermography) is a process where a thermal camera captures and creates an image of an object by using infrared radiation emitted from the object in a process.

Thermographic cameras usually detect radiation in the long-infrared range of the electromagnetic spectrum (roughly 8-14 μm) and produce images of that radiation, called thermograms. The amount of radiation emitted by an object increases with temperature; therefore, thermography allows one to see variations in temperature.

Thermal images, or thermograms, are actually visual displays of the amount of infrared energy emitted by an object. It is important to create the best images possible to extract meaningful data regarding the detection, calculation, and identification of objects in an image.

Thus, the "Blackbody Temperature Approximation" measurement method of present invention requires placing a test object next to a blackbody reference source that is preset to a specified temperature, and recording the electromagnetic (EM) radiation from both radiation sources (preferably in the same image frame) through an infrared imaging device in 3-16 μm wavelength band. Also, a processing apparatus is needed to execute steps comprising: acquiring, storing, and analyzing the greyscale of the image. The method also requires a temperature measuring apparatus to record the test object's contact temperature.

Besides, the processing apparatus is also required to include executing at least a mathematical algorithm for blackbody-related calculations, described as follows:

Comparing the grey value of test object image to that of blackbody reference image, the EM radiation from the test object can be approximated to a corresponding blackbody temperature ($T_{aB}$), by applying the Planck's law.

Then, based on the Stefan-Boltzmann law, the effective emissivity of the test object can be computed by comparing the approximated blackbody temperature ($T_{aB}$) to the test object's contact temperature ($T_C$), or $\varepsilon_{eff}=(T_{aB}/T_C)^{1/4}$.

The emissivity of nonthermal FIR-photons radiation for test object, $\varepsilon_o$, can be compute by $\varepsilon_o=\varepsilon_{eff}-\varepsilon_m$, where $\varepsilon_m$ is the test object's emissivity of blackbody radiation measured by FTIR.

Also, the radiant power of nonthermal FIR-photons radiation from the test object can be calculated by the Stefan-Boltzmann law:

$$P=A\sigma\varepsilon_o T^4 \qquad\qquad \text{(Equation 2)}$$

where P=radiant power, A=surface area,
T=temperature in ° K, and σ=Stefan-Boltzmann constant.

As described above, the systems and methods of present invention can be used to detect and determine if the test object is indeed emitting nonthermal FIR-photons radiation with a simple parameter, the approximated blackbody temperature ($T_{aB}$). If yes, the radiant power and emissivity of the nonthermal FIR-photons radiation can be further computed, which has never been done or taught before.

Though, thermography (thermal imaging) has a long history and its use has increased dramatically with the commercial and industrial applications for the past decades. Numerous inventions in prior art have related thermal imaging to blackbody thermal radiation, but are mostly for detection of objects and measurement of temperatures (for examples, U.S. Pat. or Pat. Appl. No. 20230245541, 20230204429, 11604098, 20210341337, 20210123818, 10272920, 9357963, 8389939, 7795583). None of prior art teaches the methods and systems for detecting and measuring nonthermal FIR-photons radiation as disclosed in the present invention.

OBJECTS AND ADVANTAGES

Accordingly, one object of this invention is to provide a method for detecting and measuring nonthermal FIR-photons radiation in 3-16 μm wavelength spectrum;

Another object of this invention is to provide a system for detecting and measuring nonthermal FIR-photons radiation in 3-16 μm wavelength spectrum;

Another object of the present invention is to provide a simple and easy-to-use device for determining if a test object emits nonthermal FIR-photons radiation in 3-16 μm wavelength spectrum.

Also, another object of the present invention is to provide a simple and easy-to-use device for measuring the radiant power and emissivity of an object that emits nonthermal FIR-photons radiation in 3-16 μm wavelength spectrum.

These objectives are achieved by devices, methods and systems comprising at least a test object, a contact temperature measuring means, a blackbody reference source, an infrared imaging device, and a processing apparatus configured to execute a set of instructions for performing operations including acquiring test object's contact temperature, capturing thermal image of test object and blackbody reference, and calculating the grey values of test object image and blackbody reference image to produce an approximated blackbody temperature for the test object; whereby the radiant power and emissivity of test object's nonthermal far infrared radiation can be determined by comparing the approximated blackbody temperature to the test object's contact temperature.

Other objects, features, and advantages of the present invention will hereinafter become apparent to those skilled in the art from the following description.

SUMMARY OF THE INVENTION

In accordance with the present invention, methods and systems for detecting and measuring nonthermal far infrared radiation in 3-16 μm wavelength spectrum comprise at least a test object, a contact temperature measuring means, a blackbody reference source, an infrared imaging device, and a processing apparatus configured to execute a set of instructions for performing operations including acquiring test object's contact temperature, capturing thermal image of test object and blackbody reference, and calculating the grey-scales of test object and blackbody to produce an approximated blackbody temperature for the test object; whereby the radiant power and emissivity of test object's nonthermal far infrared radiation can be determined by comparing the approximated blackbody temperature to the object's contact temperature.

BRIEF DESCRIPTION OF THE DRAWINGS

FIG. 7 shows a method in a flowchart illustrating an exemplary process of the present invention for computing the approximated blackbody temperature of the test object.

REFERENCE NUMERALS IN DRAWINGS

| | | | |
|---|---|---|---|
| 11 | Test Object | 12 | Blackbody Reference Source |
| 22 | Contact Temperature Sensor | 23 | Connecting Cable |
| 24 | Temperature Processor | 25 | Temperature Display |
| 31 | Infrared Imaging Device | 41 | Processing Apparatus |
| 301 | Infrared Camera in 3-16 μm | 302 | Infrared Camera in 8-14 μm |
| 311 | Bandpass Filter Accessory | 351 | Infrared Thermal Image |
| 352 | Image of Blackbody Reference | 353 | Image of Test Object |
| 354 | Image of Background Scene | 400 | Measurement Process |
| 500 | Calculation Process | | |

DETAILED DESCRIPTION OF THE INVENTION

By definition, the emissivity, ε, is the ratio of the radiant energy emitted by a surface to that emitted by a black body at the same temperature given by the Stefan-Boltzmann law. All objects emit thermal radiation in 4-25 μm wavelength range at room temperature (around 25° C.) and have an emissivity least than 1.0, while the 1.0-emissivity (ε=1.0) is theoretically assigned to an ideal black body and thus unsurpassable.

However, when a material comprises a certain polycrystalline structure that creates crystal field splitting under an electrostatic field, it may emit specific FIR photons at 3-16 μm wavelengths indefinitely. In this case, the emissivity of said material may be greater than 1.0. It is an outcome of adding the nonthermal FIR-photons radiation in 3-16 μm to the usual blackbody radiation in 4-25 μm. Such material is sometimes called persistent FIR-luminescent material, which may be found in forms of natural minerals or lab-synthesized composites.

Since FIR became a hopeful alternative therapy, numerous FIR therapeutic devices have been developed over the years, but only shown limited effects. The problems came from lack of a valid measurement method for detecting the nonthermal FIR-photons radiation in order to provide guidelines and benchmarks that facilitate the development of FIR products.

Responding to the needs, the methods and systems of the present invention provide a simple approach to detect and measure the nonthermal FIR-photons radiation that was once invisible and imperceptible.

Figure 1:
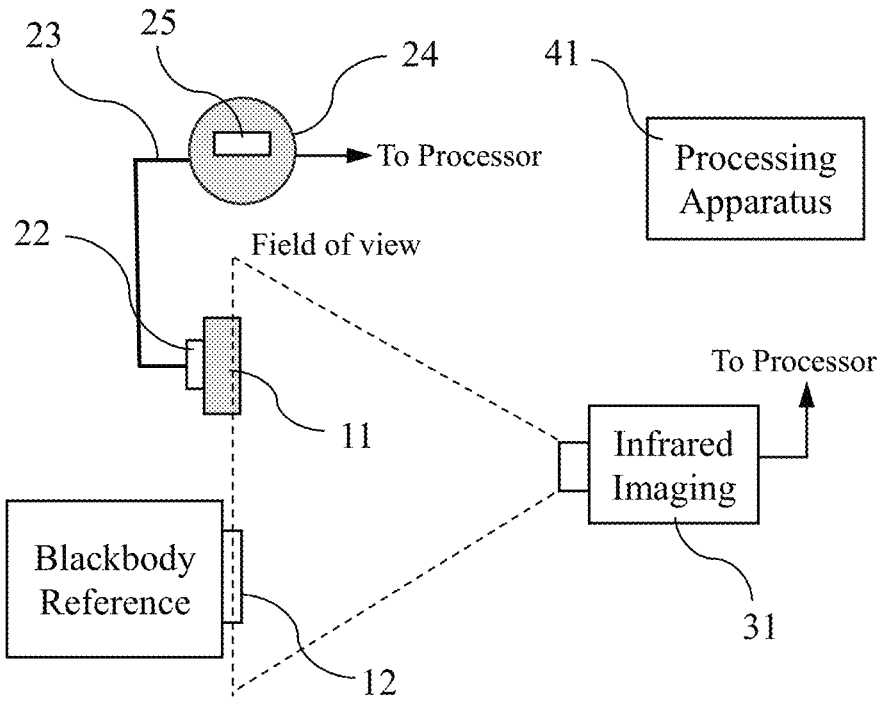
FIG. 1 shows a schematic diagram illustrating an exemplary system of the present invention.

FIG. 1 shows a schematic diagram illustrating an exemplary system of the present invention for measurement of nonthermal FIR-photons radiation. The system includes at least a test object 11, a contact temperature sensing means 22, a blackbody reference source 12, an infrared imaging device 31, and a processing apparatus 41.

The test object 11 may be in various shapes, such as sphere or plate, and in any sizes. However, in order to generate a thermal image that genuinely represents the radiant energy emitted from the surface without distortion, a flat surface area at least 5 mm by 5 mm is preferred.

A contact temperature sensing means 22 is required to be in physical contact with the test object 11 to monitor the object's contact temperature. There are a few types of contact temperature sensors available, including thermocouples, thermostats, thermistors, and resistive temperature detectors (RTDs).

As most contact temperature measuring units are passive devices, they do not produce an output on their own. An external kit, including a temperature processor 24 with temperature display 25 and a connecting cable 23, is needed for generating and displaying the temperature readings. The contact temperature data may be transmitted to the processing apparatus 41 via wire or wireless. In some embodiments, the contact temperature is recorded manually.

In one embodiment, the contact temperature sensing means 22 is a thermocouple, while in the other embodiment, it is a platinum RTD.

Blackbody radiation source, or temperature reference source, is a calculable radiation source that is frequently used in radiometry and remote sensing. In one embodiment, the blackbody reference source 12 is a Blackbody Calibrator with a temperature operation range in about 20-50° C. and is preferably preset to 40° C., with an accuracy of ±0.2° C. and stability of ±0.1° C./30 minutes.

In some embodiments, the infrared imaging device 31 is an infrared camera. The infrared camera is fitted with an IR detector, usually in a focal plane array (FPA), of micron-size detecting elements or "pixels". The infrared camera of present invention requires the use of FPAs that respond to longer wavelengths (mid- and long-wavelength infrared). The desired spectral band is 3-16 μm, while the 8-14 μm band is preferred for practical reasons.

The most common types of IR detectors are InSb, InGaAs, HgCdTe and QWIP FPA, depending on the infrared region to be detected. For examples, the IR detection region of Indium gallium arsenide (InGaAs) is 1.1-1.7 μm and Indium antimonide (InSb) is 1-5 μm. Various forms of mercury cadmium telluride ($Hg_{1-x}Cd_xTe$) have IR detection windows in 1.5-1.8 μm, 2.2-2.4 μm, 3-5 μm, and 8-12 μm. Quantum Well Infrared Photodetectors (QWIPs) are typically made of gallium arsenide (GaAs) and can be tailored to detect infrared in 3-20 μm.

The resolution of an IR camera may be 160×120 or 320×240 pixels, up to 1280×1024 in some embodiments, with a preferrable dynamic range of above 14 bits to generate at least 16,000 grey levels (greyscale) for the image.

A lens system for focusing scene radiation onto the detector array FPA and appropriate processing electronics displaying the image are required.

Figure 2:
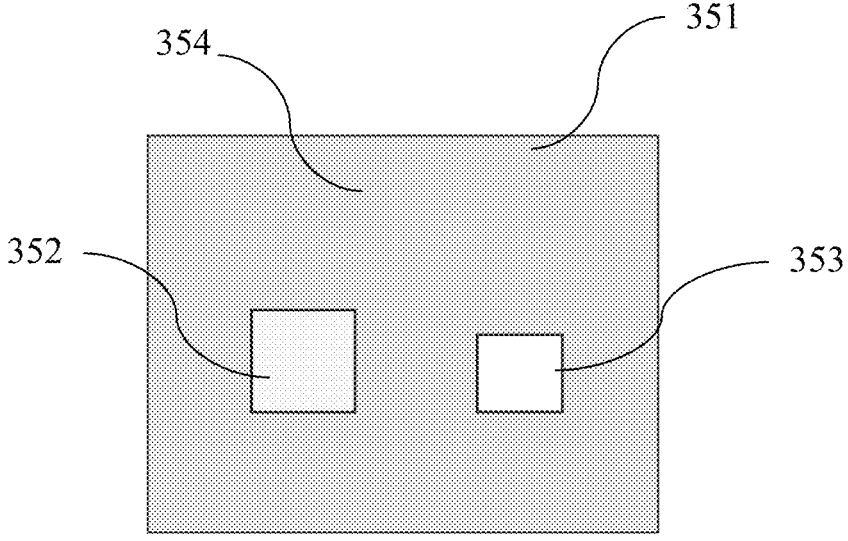
FIG. 2 shows an exemplary thermal image acquired by the system shown in FIG. 1.

The infrared camera can convert IR radiation (heat) into visible images that depict the spatial distribution of temperature differences in a scene viewed by the IR camera. FIG. 2 illustrates a thermal image 351 captured by the infrared camera, showing different brightness (greyscale) for the images of test object 353 and blackbody reference 352, in front of background scene 354, indicating respective temperatures.

In practice, it is important to match the IR detector response with either of the two atmospheric windows: mid wavelength IR band (MWIR) or long wavelength IR band (LWIR). MWIR is typically about 3-5 μm, and LWIR is about 8-14 μm.

Figure 3:
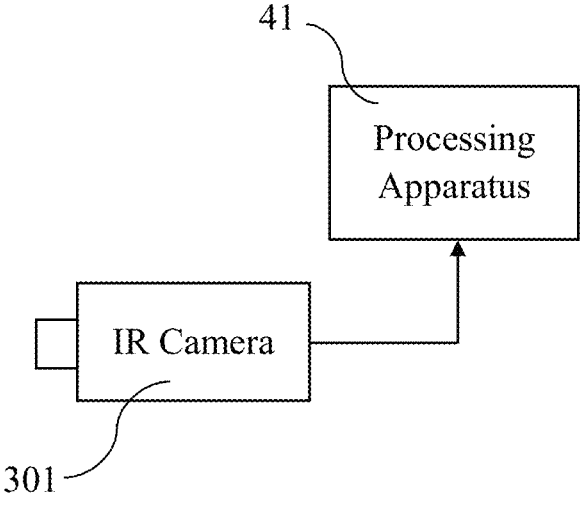
FIG. 3 shows a schematic diagram illustrating an exemplary infrared imaging device of the present invention.
Figure 4:
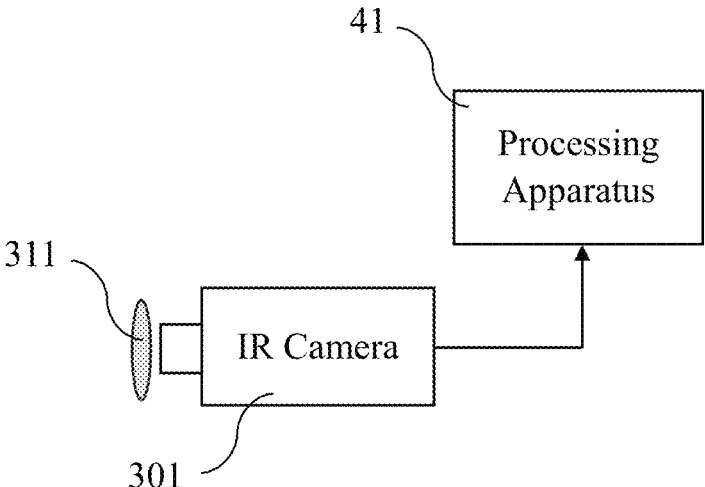
FIG. 4 shows a schematic diagram illustrating another exemplary infrared imaging device with a set of bandpass filters.

FIG. 3 shows, in one embodiment, an IR camera 301 with an IR detector in 3-16 μm spectral band is used, while FIG. 4 shows, in another embodiment, a set of bandpass filters 311 is applied for selecting the imaging spectral sub-bands.

In theory, blackbody radiation has a specific, continuous spectrum of wavelengths that depend only on the body's temperature and is governed by Planck's law. The Planck's law (Planck Distribution) can be expressed in term of wavelength (λ) and temperature (T):

$$B_\lambda(\lambda,T)=(2hc^2/\lambda^5)\{1/[\exp(hc/\lambda k_B T)-1]\} \qquad \text{(Equation 3)}$$

Where $h=6.626070\times10^{-4}$ J·Hz$^{-1}$ (Planck constant)
$k_B=1.380649\times10^{-23}$ J·K$^{-1}$ (Boltzmann constant)
Δ=wavelength, c=speed of light, and T=Temperature (° K)

Figure 5:
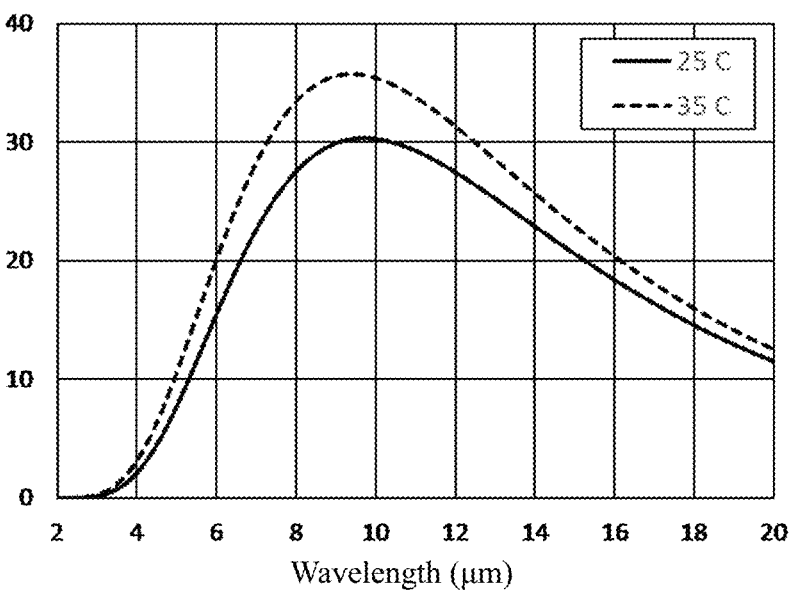
FIG. 5 illustrates the Planck distribution of blackbody radiation at 25 and 35° C., respectively.

The theoretical Planck distributions for blackbody radiation at temperatures 25° C. and 35° C. are displayed in FIG. 5. It is found that about 40% of the total energy of Planck distribution is accrued in the 8-14 μm wavelength range.

As Planck distributions at temperatures around room temperature (i.e., 20-40° C.) have a similar characteristic profile, sampling of subtotal energy within 8-14 μm band may represent the total energy of the whole distribution. Therefore, in some embodiments, measurement with an IR detector in 8-14 μm wavelength range is purposely selected to stand for the Planck distribution in the whole 4-25 μm spectrum.

Figure 6:
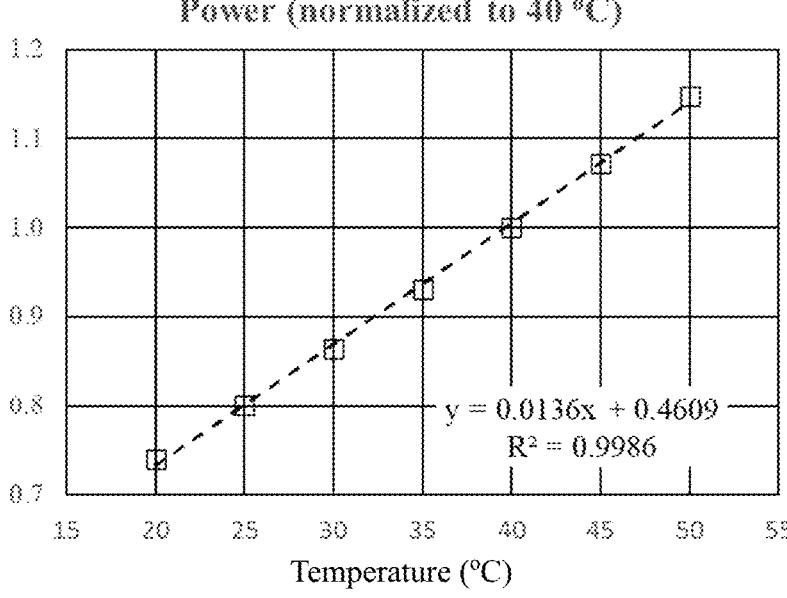
FIG. 6 displays the linear relationship between the normalized radiant power over the 8-14 μm wavelength band and the blackbody temperature, in the range of 20-50° C.

Moreover, FIG. 6 shows a correlation between the radiant power and temperature over the selected 8-14 μm wavelength band of the Planck Distribution. For ease of computation in the present invention, the radiant powers at different temperatures are normalized to the specific power of blackbody at 40° C., by using blackbody radiation at 40° C. as referenced benchmark.

The linear relationship between the radiant power and temperature, as shown in FIG. 6, can be expressed as:

$$P_T=0.0136T+0.4609 \qquad \text{(Equation 4)}$$

where $P_T$ is the normalized power at a temperature T, with respect to blackbody power at 40° C.

The relationship in Equation 4 is linear so that a factor of 0.0136/° C. may be implemented in a mathematical algorithm to calculate the approximated blackbody radiation for the test object.

Mathematically, the relationship in Equation 4 can be further simplified to be:

$$\Delta T=T_B-T_O=(1-P_O/P_B)/0.0136$$

where $T_O$=temperature of test object, $T_B$=temperature of blackbody reference
$P_O$=radiant power of test object, $P_B$=radiant power of blackbody reference
ΔT=the temperature difference between test object and blackbody reference.

In some embodiments of the present invention, a blackbody reference is preset to 40° C. so that the equation may be rewritten as:

$$T_{aB}=40-(1-P_O/P_B)/0.0136 \qquad \text{(Equation 5)}$$

In other words, the approximated blackbody temperature ($T_{aB}$) for the test object 11 can be determined by simply measuring the average grey level ($P_o$) of the test object image 353 and the grey level ($P_B$) of the blackbody reference image 352, followed by plugging the value of $P_O/P_B$ into the Equation 5.

The simplified mathematic formula in Equation 5 becomes the foundation of the method of present invention for determining the approximated blackbody temperature ($T_{aB}$) for the test object 11.

For example, after thermal images of test object and blackbody reference are captured and if the average grey-scale of test object image is computed to be about 0.985 (98.5%) of that of the blackbody reference at 40° C., the difference in greyscale is calculate to be 0.015 (1.5%) and the temperature difference is $\Delta T=(1-0.985)/0.0136=1.1°$ C. It results in an approximated blackbody temperature for the test object, $T_{aB}=40.0-1.1=38.9°$ C.

Accordingly, in some embodiments, the processing apparatus 41 is required to execute a set of instructions for performing operations including capturing thermal image of test object and blackbody reference, preferably in the same image frame, and calculating the grey values of test object (represented by $P_O$) and blackbody reference ($P_B$) to produce an approximated blackbody temperature ($T_{aB}$) for the test object, based on the Equation 5 described above.

In addition, the processing apparatus 41 is also required to execute instructions for acquiring the test object's contact temperature, as described later.

FIG. 7 shows the method of present invention in a flowchart, illustrating an exemplary process in computing the approximated blackbody temperature ($T_{aB}$) for the test object. The process presented herein is intended for illustrative purpose only and may not be limited to the steps as disclosed, nor in that exact order.

In step 410, the test object 11, being in any shape or size, is prepared for having at least a 5 mm×5 mm flat surface area. Though, a larger flat surface area, such as about 10 mm×10 mm, is always preferred for calculating the average grey value in a target image area with better quality.

In step 420, the test object 11 is positioned at an appropriate distance from the IR imaging device 31, with the flat surface area facing the IR imaging device.

In step 430, the test object 11 is connected to the contact temperature sensor 22, which is linked to a temperature processor for measuring the test object's contact temperature, $T_C$.

In step 440, the blackbody reference 12 is positioned in proximity of test object 11, preferably at about the same distance from IR imaging device 31 to line up with the test object 11.

In step 450, the blackbody reference 12 is preset to a specified temperature, preferably 40° C.

In step 460, the images of blackbody reference 352 and test object 353 are captured in the same image frame 351 by IR imaging device 31, amidst the image of background scene 354.

In step 470, the average grey values in a specified target area on the blackbody reference image 352 and on the test object image 353 are separately computed by the processing apparatus 41 and recorded.

In step 480, the average grey value of test object image 353 is compared to that of blackbody reference image 352, so that the approximated blackbody temperature ($T_{aB}$) for the test object 11 may be determined by a mathematical algorithm installed in the processing apparatus 41 utilizing the linear relationship described in FIG. 6, or using the simplified formula in Equation 5.

In step 490, a preliminary decision can be made by comparing the computed approximated blackbody temperature ($T_{aB}$) to the test object's contact temperature ($T_C$):

If $T_{aB}>T_C$, it means that the test object 11 does emit nonthermal FIR-photons; The process may proceed further to Step 500 to determine its radiant power and effective emissivity.

If $T_{aB}<T_C$, it means that the test object 11 is just an ordinary object and no nonthermal FIR-photons radiation may be detected; The process stops, and it is so indicated.

Figure 8:
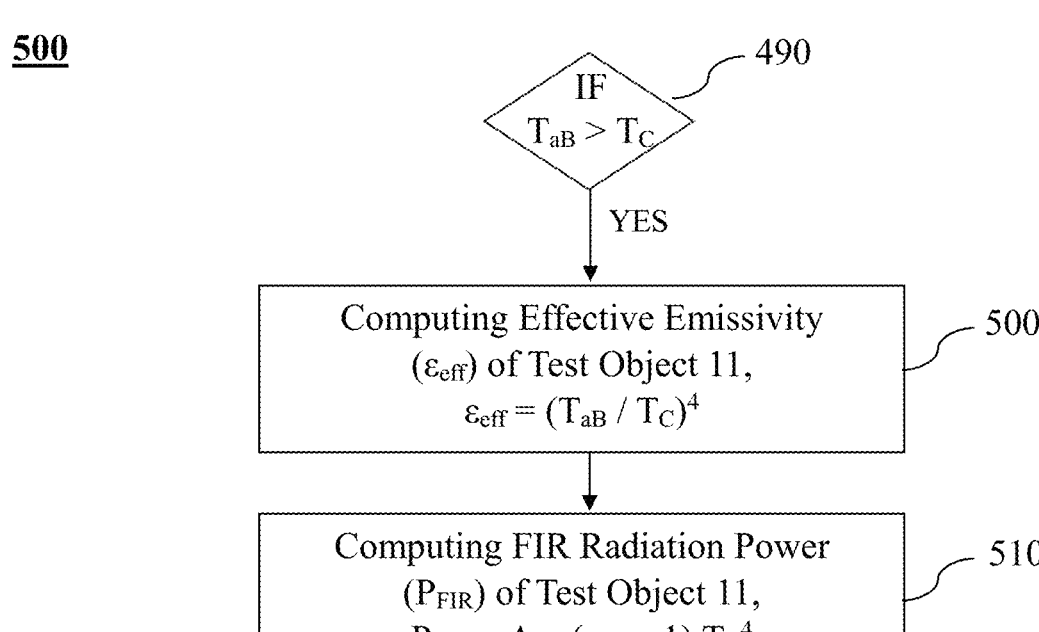
FIG. 8 shows a flowchart illustrating an exemplary process for further computing the effective emissivity and radiant power of the test object, following the method shown in FIG. 7.

The steps described in FIG. 7 provide an easy and simple method to determine whether the test object 11 radiates nonthermal FIR-photons or not. If the test object 11 indeed emits nonthermal FIR-photons, as in the case $T_{aB}>T_C$, the process may continue to step 500, which is illustrated in FIG. 8.

In step 500, the effective emissivity can be determined by a mathematical algorithm installed in the processing apparatus 41 utilizing the relationship $\varepsilon_{eff}=(T_{aB}/T_C)^4$, derived from the Stefan-Boltzmann law, where both temperatures ($T_{aB}$, $T_C$) are expressed in ° K.

In step 510, the radiant power ($P_{FIR}$) of nonthermal FIR-photons radiation from the surface of test object 11 can be determined by another mathematical algorithm installed in the processing apparatus 41 utilizing the relationship $P_{FIR}=A\sigma(\varepsilon_{eff}-1)T_C^4$, given by the Stefan-Boltzmann law.

The method as described in step 510 offers a quick assessment of the nonthermal FIR radiation power ($P_{FIR}$) emitted from the test object 11 by assuming the test object is a perfect black body with a thermal emissivity $\varepsilon=1$.

Nonetheless, most FIR-emitting composites may have a blackbody-like thermal emissivity only in about 0.85-0.95. In order to make a more precise estimate, the material emissivity of the test object will be measured by FTIR Spectroscopy.

Figure 9:
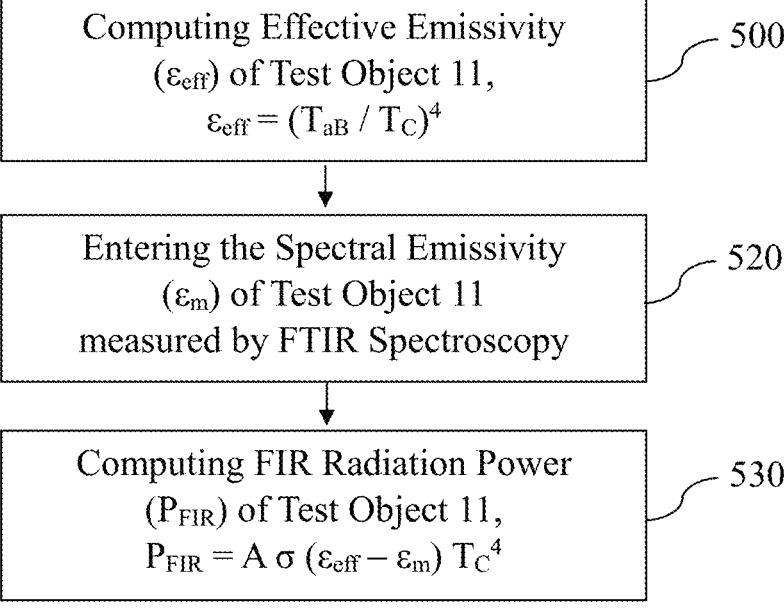
FIG. 9 shows a flowchart illustrating another exemplary process for further computing the actual radiant power of the test object, following the method shown in FIG. 7.

FIG. 9 shows a method in some embodiments that the measurement process may proceed further to accurately determine the FIR radiation power ($P_{FIR}$) for the test object 11.

In step 520, the thermal emissivity of the test object 11 is measured by a FTIR Spectrometer for the entire spectral region in 2.0-25.0 μm. An average value of the measured emissivity, $\varepsilon_m$, over a specified spectral region (typically 8-14 μm) may be computed from the FTIR results.

In step 530, the actual radiant power ($P_{FIR}$) of nonthermal FIR-photons radiation from the test object 11 can be determined by a mathematical algorithm installed in the processing apparatus 41 utilizing the relationship $P_{FIR}=A\sigma(\varepsilon_{eff}-\varepsilon_m)T_C^4$.

In essence, the methods and systems of the present invention may offer three functions:

1). Determining if the test object is a FIR-photons emitting (FIR-luminescent) material;

2). Providing a quick assessment on radiant power and effective emissivity; and

3). Producing accurate measurements of the radiant power and emissivity of nonthermal FIR-photons radiation from the test object.

Figure 10:
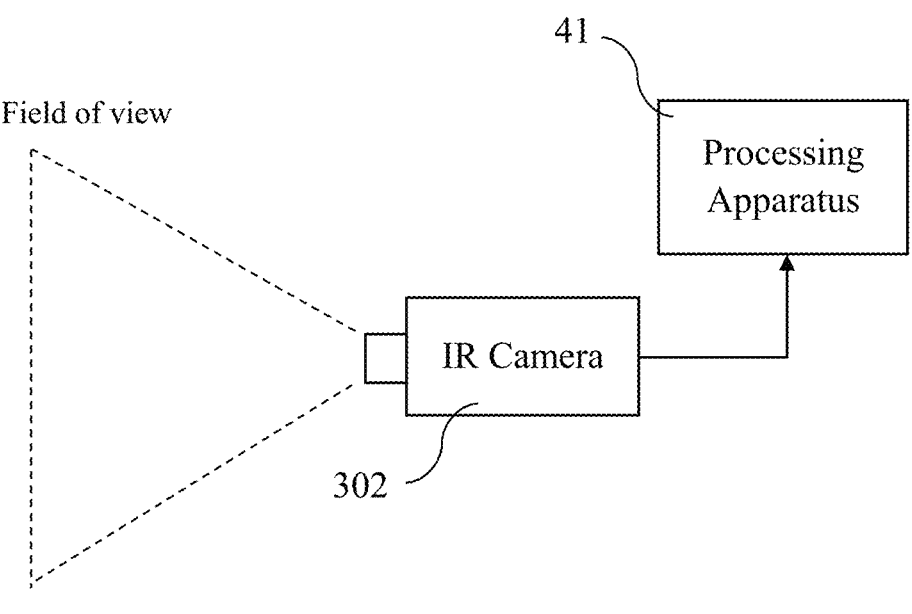
FIG. 10 shows a schematic diagram illustrating an exemplary device of the present invention.

FIG. 10 shows a schematic diagram illustrating a devise of the present invention for measuring nonthermal FIR-photons radiation. The device includes at least an IR camera 302, and a processing apparatus 41.

In one embodiment, the IR camera 302 has a VOx (Vanadium Oxide) UFPA in 8-14 μm spectral band. The pixel resolution is 640×512, with a 14-bit dynamic range.

The processing apparatus 41 is configured to execute a set of instructions for performing operations including acquiring the thermal image with IR camera 302, calculating the greyscale of the thermal images, and computing to produce an approximated blackbody temperature ($T_{aB}$) for the test object as disclosed above.

By design, the device may contain any or all three of aforementioned functions. In one embodiment, the device can be configured to simply determine if the test object is a persistent FIR-luminescent material. In another embodiment, the device is configured to make quick assessment on the radiant power and effective emissivity. In some embodiments, the device may have any combination of the three functional options.

During operating the device of present invention, a separate blackbody reference preset to a specified temperature (preferably at 40° C.) and a contact temperature measuring device will also be required. The object's contact temperature may be manually or automatically recorded, as in some embodiments of the present invention.

Figure 11:
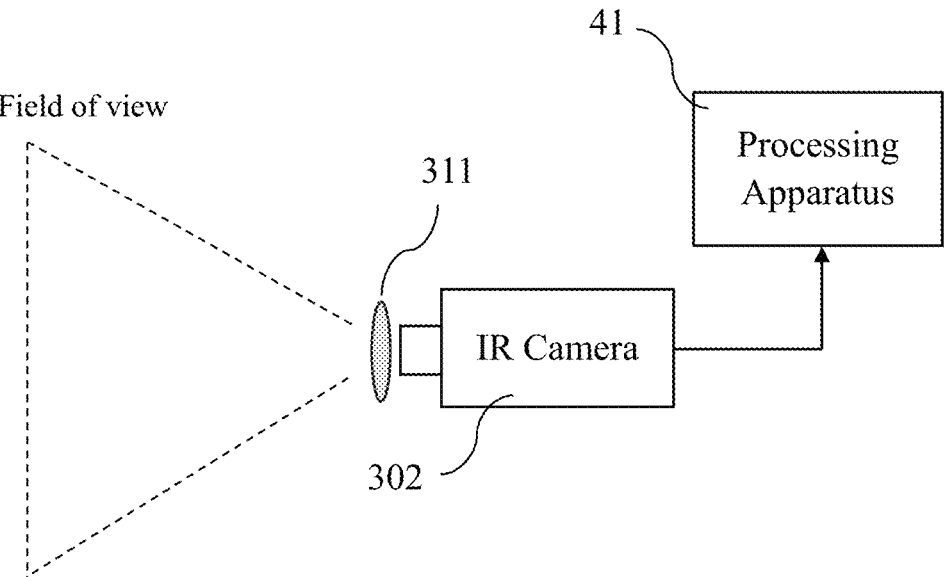
FIG. 11 shows a schematic diagram illustrating another exemplary device of the present invention.

FIG. 11 is a schematic diagram illustrating another exemplary device of the present invention that is further equipped with bandpass filters for detailed spectral analysis.

In some embodiments, the bandpass filters are selected to have a Center Wavelength (CWL) at about 8, 9, 10, 11, 12, 13, and 14 μm, when an 8-14 μm IR detector is used. In other embodiments, different CWL may be required when an IR detector in the other part of 3-16 μm wavelength spectrum is used, for example, in 3-5 μm range for MWIR. The Full Width-Half Max (FWHM) is about 1 μm, or about 2 μm.

In experiments, a FIR-luminescent composite developed by the present inventor was tested using the method of present invention. The test object was prepared to have a 10×10 mm flat area. The contact temperature of said object was measured to be 36.05° C. using a platinum RTD.

The IR camera has a VOx UFPA detector array, operating in 8-14 μm band (LWIR). A blackbody calibrator preset to 40° C. was used. The test object was determined by the method of present invention to have an approximated blackbody temperature at 38.9° C., signifying an effective emissivity of 1.04 (ε=1.04). It indicated that the test object was indeed a persistent FIR-luminescent material, as $T_{aB} > T_C$, where $T_{aB} = 38.9°$ C. and $T_C = 36.05°$ C.

The thermal emissivity of the test object was measured to be about 0.92 over the 8-14 μm band by a FTIR spectrometer. The radiant power of nonthermal FIR-photons radiation was calculated to be about 2.5 mW, with an emissivity of 0.12.

As a result, the test object was confirmed to be a FIR-luminescent composite that emits nonthermal FIR-photons in the 8-14 μm band.

In another experiment, a MWIR detector, Mercury Cadmium Telluride (HgCdTe), was used to measure the 3-5 μm wavelength FIR-photons radiation from the same test object. It resulted in an effective emissivity of 0.72, while the measured thermal emissivity was 0.52 in the same band by a FTIR spectrometer. It signified an emissivity of 0.20 for nonthermal FIR-photons radiation from the test object in the 3-5 μm wavelength range.

It is worthwhile noting here. Normally, an ordinary object emits thermal radiation in 4-25 μm wavelength band, at room temperature, and hardly radiates anything in 3-4 μm range, as shown in the Planck Distribution in FIG. 5. Only a lab-synthesized FIR-luminescent composite would have the FIR-photons emission in that range. Though, the radiant power in 3-5 μm would be much lower than the average power in the 8-14 μm band.

Combining the results in MWIR (3-5 μm) and LWIR (8-14 μm) from above experiments, it confirmed that the test object was indeed emitting FIR-photons in about 3-16 μm range, per design, by the method and system of the present invention.

CONCLUSION, RAMIFICATIONS, AND SCOPE

According to the present invention, devices, methods, and systems for detecting and measuring nonthermal far infrared radiation from the surface of a test object comprise at least a test object, a contact temperature measuring means, a blackbody reference source, an infrared imaging device, and a processing apparatus configured to execute a set of instructions and a series of mathematic algorithms for performing operations including acquiring test object's contact temperature, capturing thermal image of test object and blackbody reference, and computing the grey values of test object and blackbody images to produce an approximated blackbody temperature for the test object. The radiant power and emissivity of object's nonthermal far infrared radiation can be determined by comparing the approximated blackbody temperature to the object's contact temperature.

The present invention provides a crucial tool for detection and measurement of nonthermal FIR-photons radiation in 3-16 μm wavelength range, which is otherwise undetectable and imperceptible.

The invention has been described above. Obviously, numerous modifications and variations of the present invention are possible in light of the above teachings. Such variations are not to be regarded as a departure from the spirit and scope of the invention and all such modifications as would be obvious to one skilled in the art are intended to be included within the scope of the following claims.

The invention claimed is:

1. A method for measuring nonthermal far infrared radiation emitting from the surface of a test object comprising:
   a) providing the test object;
   b) providing a temperature measuring means to measure the contact temperature of the test object;
   c) providing a blackbody reference source preset to a specified temperature;
   d) providing an infrared imaging device to capture thermal image of test object and blackbody reference;
   e) providing a processing apparatus to perform operations including acquiring, storing, analyzing, computing, and displaying the data of thermal image;
   f) providing a mathematical algorithm to execute blackbody related calculations;
   wherein steps a) through f) produce an approximated blackbody temperature for the test object; whereby a radiant power and an emissivity of test object's nonthermal far infrared radiation can be determined by comparing said approximated blackbody temperature to test object's contact temperature.

2. The method of claim 1, wherein:
   said test object has a flat surface with dimensions of at least a 5 mm by 5 mm (millimeters).

3. The method of claim 1, wherein:
   said temperature measuring means is a digital platinum RTD thermometer.

4. The method of claim 1, wherein:
   said blackbody reference source is a blackbody calibrator having a temperature operation range from about 20 to about 50° C.

5. The method of claim 4, wherein:
   said blackbody calibrator is preset to 40° C.

6. The method of claim 1, wherein:

said infrared imaging device is an infrared camera having a spectral band covering at least a part of 3-16 μm wavelength spectrum.

7. The method of claim 1, wherein:

said infrared imaging device is an infrared camera having a spectral band in about 8 μm about 14 μm wavelength range.

8. The method of claim 1, wherein:

said infrared imaging device further includes a set of infrared bandpass filters.

9. The method of claim 1, wherein:

said mathematical algorithm include at least the operation of the Planck's law.

10. The method of claim 1, wherein:

said mathematical algorithm include at least the operation of the Stefan-Boltzmann law.

11. A system for measuring nonthermal far infrared radiation emitting from the surface of an test object comprising at least:

a) a contact temperature measuring means, b) a blackbody reference source, c) an infrared imaging device, and d) a processing apparatus configured to execute a set of instructions for performing operations including acquiring test object's contact temperature, capturing a thermal image of test object and blackbody reference source, and computing grey values for the test object and blackbody reference source to produce an approximated blackbody temperature for the test object; whereby a radiant power and an emissivity of test object's nonthermal far infrared radiation can be determined by comparing said approximated blackbody temperature to test object's contact temperature.

12. The system of claim 11, wherein:

said infrared imaging device is an infrared camera having a spectral band covering at least a part of about 3 μm to about 16 μm wavelength range.

13. The system of claim 11, wherein:

said blackbody reference source is a blackbody calibrator preset to 40° C.

14. A device for measuring nonthermal far infrared radiation emitting from the surface of an object comprising at least:

a) an infrared camera for capturing thermal image of test object and a blackbody reference source; and b) a processing apparatus for executing instructions for performing operations including computing grey values of said thermal image to produce an approximated blackbody temperature for the test object, whereby a radiant power and an emissivity of test object's nonthermal far infrared radiation can be determined by comparing said approximated blackbody temperature to test object's contact temperature.

15. The device of claim 14, wherein:

Said infrared camera has a VOx (Vanadium Oxide) UFPA detector in LWIR (8-14 μm).

16. The device of claim 14, wherein:

Said infrared camera has a mercury cadmium telluride (HgCdTe) FPA detector in MWIR (3-5 μm).

* * * * *